(12) United States Patent
Lienhart et al.

(10) Patent No.: US 6,816,949 B2
(45) Date of Patent: Nov. 9, 2004

(54) METHOD AND APPARATUS FOR CACHE MANAGEMENT

(75) Inventors: Rainer W. Lienhart, Santa Clara, CA (US); Yen-Kuang Chen, Sunnyvale, CA (US); Matthew Holliman, Sunnyvale, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 10/040,007

(22) Filed: Jan. 3, 2002

(65) Prior Publication Data

US 2003/0126370 A1 Jul. 3, 2003

(51) Int. Cl.[7] ............................................... G06F 12/12
(52) U.S. Cl. ...................... 711/158; 711/160; 711/165; 711/171; 711/173
(58) Field of Search ................................. 711/160, 165, 711/171, 173, 158; 707/101; 710/68

(56) References Cited

U.S. PATENT DOCUMENTS

| 5,450,562 A | * | 9/1995 | Rosenberg et al. | 711/119 |
| 5,652,857 A | * | 7/1997 | Shimoi et al. | 711/113 |
| 6,002,411 A | * | 12/1999 | Dye | 345/542 |
| 6,360,300 B1 | * | 3/2002 | Corcoran et al. | 711/139 |
| 2002/0073298 A1 | * | 6/2002 | Geiger et al. | 711/206 |

* cited by examiner

Primary Examiner—Jack A. Lane
(74) Attorney, Agent, or Firm—Blakely, Sokoloff, Taylor & Zafman LLP

(57) ABSTRACT

A cache management operation. In one embodiment, a first recall value for a first unit of data is generated, a second recall value for a second unit of data is generated, and the first and second recall values are compared. The unit of data having the higher recall value is stored in a first section of a storage device. The unit of data having the lower recall value is stored in a second section of a storage device. A greater amount of compression is performed on the unit of data having the lower recall value.

24 Claims, 3 Drawing Sheets

METHOD AND APPARATUS FOR CACHE MANAGEMENT

BACKGROUND

There exists a continuous need in the data processing field to increase the efficiency of short-term storage space. That is, with cache management, there is a need to increase the amount of data that can be stored within a storage unit without incurring additional costs in providing larger storage units.

When improving the efficiency of a cache device, one property to consider is that more frequently accessed data should be given a higher priority than less frequently accessed data.

What is needed is a cache management technique that increases the efficiency of a cache storage device and gives priority to the more frequently accessed data.

DETAILED DESCRIPTION

The present application describes a cache management operation. In one embodiment, data is stored within a storage device in an order according to the frequency the data is accessed. In one embodiment, the storage device is a cache storage device, providing storage of data for faster access relative to a larger secondary storage device.

Figure 1:
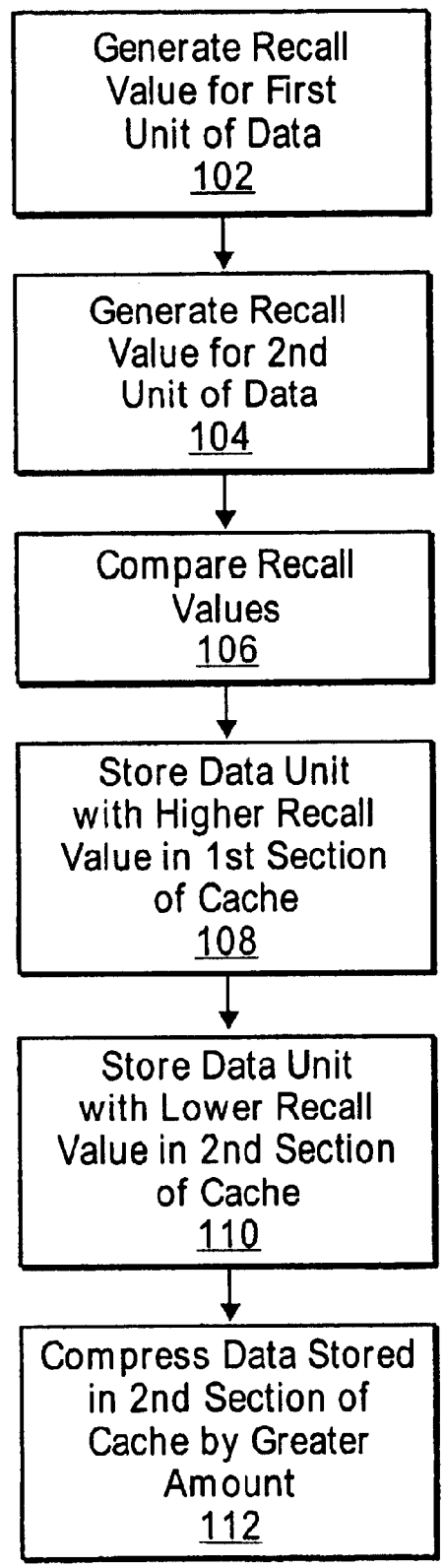
FIG. 1 is a flow diagram describing the operations of cache management according to one embodiment.

FIG. 1 provides a flow diagram describing the operation of managing data in storage device according to one embodiment. Initially, a recall value for a first unit of data is generated (102). In one embodiment, the recall value is a representation of the frequency the unit of data is accessed. A recall value for a second unit of data is also generated (104). The recall value for the first unit of data is compared with the recall value for the second unit of data (106).

The unit of data with the higher recall value is selected to be stored in a first section of the storage unit (108). The unit of data with the lower recall value is selected to be stored in a second subsequent section of the storage unit (110). The unit of data selected to be stored in the second section of the storage will be compressed, by an amount greater than the data selected to be stored in the first section of the storage unit (112).

In one embodiment, the data selected to be stored in the first section of the storage device is not compressed, but the data to be stored in the second section of the storage device is compressed. In an alternative embodiment, the data selected to be stored in the first section undergoes a first rate of compression, and data selected to be stored in the second section of the storage device undergoes a second rate of compression, greater than the first rate of compression.

In one embodiment, the operations described above are repeated following the elapse of a predetermined period of time. Moreover, the operations discussed above may be performed in parallel. For example, the generating the recall value of the first data unit and generating the recall value of the second data unit may be done in parallel.

Furthermore, the operations described above are applicable to a group of data units larger than 2. Moreover, in one embodiment, more than one unit of data may be stored in the same section of the storage device. As a result, in one embodiment, when more than one unit of data are stored in the same section of the storage device, the multiple units of data stored in the same section undergo the same rate of compression.

Figure 2:
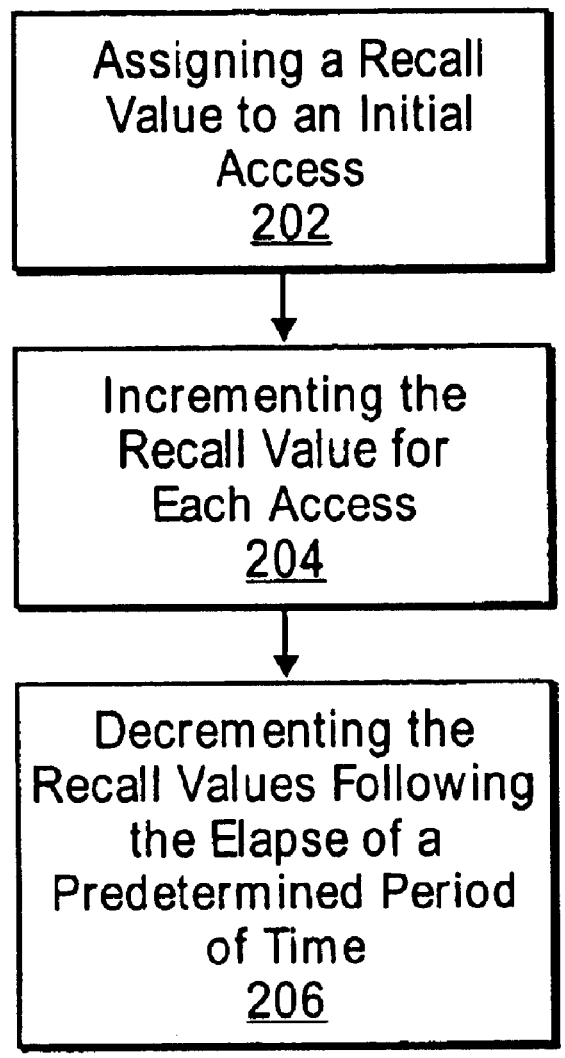
FIG. 2 is a diagram describing the operations of generating a recall value according to one embodiment.

FIG. 2 provides a diagram describing the operations of generating a recall value according to one embodiment. In one embodiment, a predetermined recall value is assigned to a unit of data when the unit of data is initially accessed, before the unit of data has been stored in the storage unit (202). For example, a recall value of 1 may be assigned to a unit of data when the unit of data is initially accessed.

In one embodiment, each time a unit of data is accessed, the recall value for the respective unit of data is incremented by a predetermined amount (204). For example, each time a unit of data is accessed, the recall value for the respective unit of data may be incremented by 1.

In one embodiment, the recall value of each unit of data stored in the storage device is decremented by predetermined amount following the elapse of a predetermined period of time, regardless of how many times it may have been accessed during the predetermined period of time (206). For example, each unit of data stored in the storage unit may be decremented by 10% every 1 second. Therefore, in one embodiment, data that is not accessed will eventually have a recall value below a predetermined threshold and be removed from the storage device.

In one embodiment, the recall value could be stored along with the respective units of data in the storage device. Alternatively, the recall values could be stored separately as a table in a separate storage device.

Figure 3:
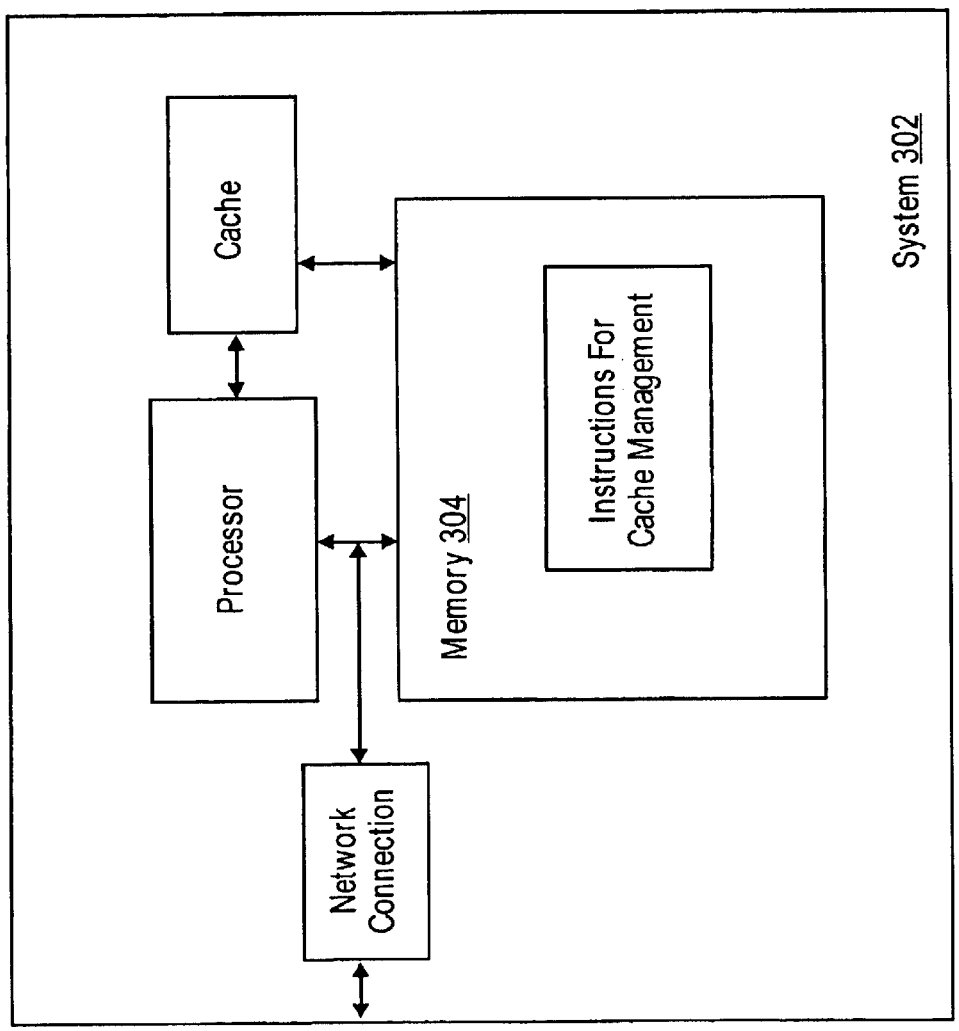
FIG. 3 is diagram of a system capable of implementing the operations of cache management according to one embodiment.

The operations described above can be stored in the memory of a computer system as a set of instructions to be executed, as illustrated in FIG. 3. In addition, the instructions to perform the operations described above could alternatively be stored on other forms of machine-readable media, including magnetic and optical disks. For example, the operations of one embodiment could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:

generating a first recall value for a first unit of data;

generating a second recall value for a second unit of data;

comparing the first and second recall values;

storing in a first section of a storage unit, one of the first unit of data and the second unit of data that having a higher recall value;

storing in a second section of the storage unit, one of the first unit of data and the second unit of data having the lower recall value; and performing a greater amount of compression on one of the first unit of data and the second unit of data having a lower recall value.

2. The method of claim 1, wherein a recall value represents a frequency a unit of data is accessed.

3. The method of claim 2, including repeating the method of claim 1 following an elapsed predetermined period of time.

4. The method of claim 3, wherein generating a recall value includes assigning a predetermined value to a unit of data when the unit of data is initially accessed before the unit of data has been stored in the storage unit.

5. The method of claim 4, wherein generating a recall value includes decrementing each recall value by a predetermined amount following the elapse predetermined period of time.

6. The method of claim 5, wherein generating a recall value includes incrementing a recall value of a unit of data to represent a number of accesses for a corresponding unit of data during the elapsed period of time.

7. A method comprising:

generating a first recall value for a first unit of data;

generating a second recall value for a second unit of data;

comparing the first and second recall values;

storing in a first section of a storage unit, one of the first unit of data and the second unit of data that having a higher recall value;

storing in a second section of the storage unit, one of the first unit of data and the second unit of data having the lower recall value;

compressing data stored in the first section of the storage unit by a first compression rate; and compressing data stored in the second section of the storage unit by a second compression rate, the second compression rate being higher than the first compression rate.

8. The method of claim 7, wherein a recall value represents a frequency a unit of data is accessed.

9. The method of claim 8, including repeating the method of claim 1 following an elapsed predetermined period of time.

10. The method of claim 9, wherein generating a recall value includes assigning a predetermined value to a unit of data when the unit of data is initially accessed before the unit of data has been stored in the storage unit.

11. The method of claim 10, wherein generating a recall value includes decrementing each recall value by a predetermined amount following the elapse predetermined period of time.

12. The method of claim 11, wherein generating a recall value includes incrementing a recall value of a unit of data to represent a number of accesses for a corresponding unit of data during the elapsed period of time.

13. A computer readable medium having stored thereon a set of instructions, which when executed by a processor perform a method comprising:

generating a first recall value for a first unit of data;

generating a second recall value for a second unit of data;

comparing the first and second recall values;

storing in a first section of a storage unit, one of the first unit of data and the second unit of data that having a higher recall value;

storing in a second section of the storage unit, one of the first unit of data and the second unit of data having the lower recall value; and performing a greater amount of compression on one of the first unit of data and the second unit of data having a lower recall value.

14. The computer readable medium of claim 13, wherein a recall value represents a frequency a unit of data is accessed.

15. The computer readable medium of claim 14, wherein the method includes repeating the method of claim 13 following an elapsed predetermined period of time.

16. The computer readable medium of claim 15, wherein generating a recall value includes assigning a predetermined value to a unit of data when the unit of data is initially accessed before the unit of data has been stored in the storage unit.

17. The computer readable medium of claim 16, wherein generating a recall value includes decrementing each recall value by a predetermined amount following the elapse predetermined period of time.

18. The computer readable medium of claim 17, wherein generating a recall value includes incrementing a recall value of a unit of data to represent a number of accesses for a corresponding unit of data during the elapsed period of time.

19. A computer readable medium having stored thereon a set of instructions, which when executed by a processor perform a method comprising:

generating a first recall value for a first unit of data;

generating a second recall value for a second unit of data;

comparing the first and second recall values;

storing in a first section of a storage unit, one of the first unit of data and the second unit of data that having a higher recall value;

storing in a second section of the storage unit, one of the first unit of data and the second unit of data having the lower recall value;

compressing data stored in the first section of the storage unit by a first compression rate; and compressing data stored in the second section of the storage unit by a second compression rate, the second compression rate being higher than the first compression rate.

20. The computer readable medium of claim 19, wherein a recall value represents a frequency a unit of data is accessed.

21. The computer readable medium of claim 20, wherein the method includes repeating the method of claim 19 following an elapsed predetermined period of time.

22. The computer readable medium of claim 21, wherein generating a recall value includes assigning a predetermined value to a unit of data when the unit of data is initially accessed before the unit of data has been stored in the storage unit.

23. The computer readable medium of claim 22, wherein generating a recall value includes decrementing each recall value by a predetermined amount following the elapse predetermined period of time.

24. The computer readable medium of claim 23, wherein generating a recall value includes incrementing a recall value of a unit of data to represent a number of accesses for a corresponding unit of data during the elapsed period of time.

* * * * *